Oct. 24, 1950     G. G. LEMONS     2,526,758
POWER MULTIPLYING AND TRANSMISSION MECHANISM
Filed Jan. 29, 1949     4 Sheets-Sheet 1

Inventor
GEORGE G. LEMONS
By Cook & Robinson
Attorney

Oct. 24, 1950 G. G. LEMONS 2,526,758
POWER MULTIPLYING AND TRANSMISSION MECHANISM
Filed Jan. 29, 1949 4 Sheets-Sheet 2

Inventor
GEORGE G. LEMONS
By Cook & Robinson
Attorney

Oct. 24, 1950   G. G. LEMONS   2,526,758
POWER MULTIPLYING AND TRANSMISSION MECHANISM
Filed Jan. 29, 1949   4 Sheets-Sheet 3

Inventor
GEORGE G. LEMONS
By Cook & Robinson
Attorney

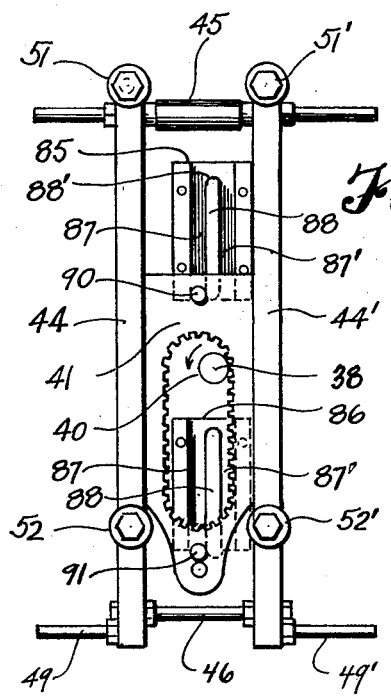
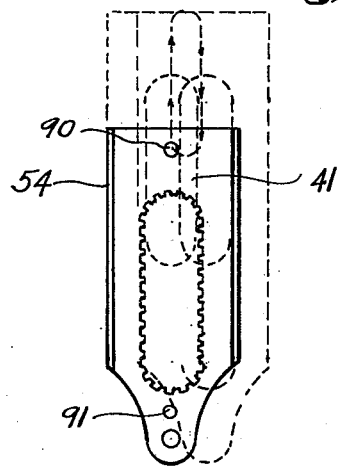
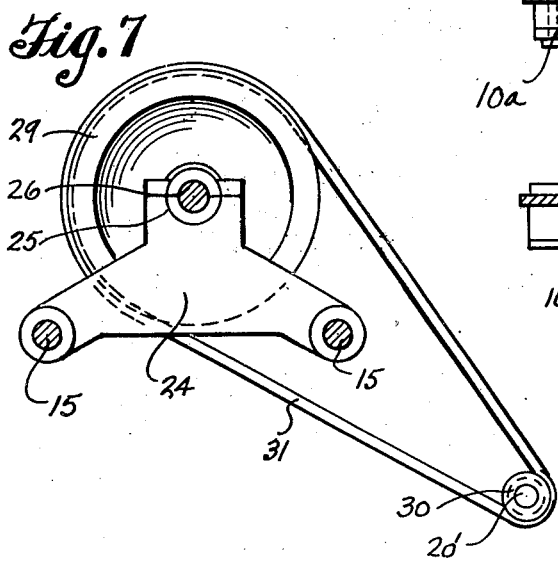
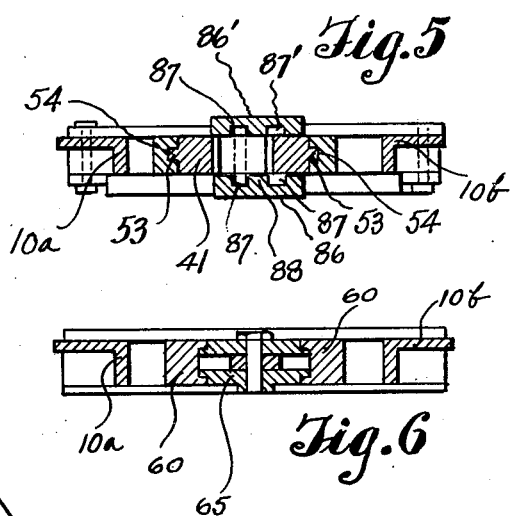

Patented Oct. 24, 1950

2,526,758

UNITED STATES PATENT OFFICE 2,526,758

POWER MULTIPLYING AND TRANSMISSION MECHANISM

George G. Lemons, Seattle, Wash.

Application January 29, 1949, Serial No. 73,565

4 Claims. (Cl. 74—30)

This invention relates to power multiplying and transmitting mechanisms and it has reference more particularly to improvements in power mechanisms and mechanical movements of that kind illustrated and described in my United States patent issued on December 16, 1930, under No. 1,784,842, wherein a mechanical movement is disclosed for the conversion of power from a rotatably driven gear to a reciprocally moving element.

In the apparatus of my above mentioned United States patent, a pinion gear is fixed on a stationary, rotatably driven shaft and held in operative mesh with an elongated, reciprocally movable internal gear in such manner as to cause the reciprocal action of the elongated gear. To maintain the elongated gear against rotation and its teeth in operative contact with the driving pinion, it is mounted for reciprocal action in a guide frame, and this frame is held during the periods of longitudinal movement of the elongated gear and then is shifted laterally, at the end of each stroke. This lateral back-and-forth shifting is accomplished by a mechanism that is synchronized with and operated by means of devices connected with the said driven shaft.

It is the principal object of this invention to provide a power transmission mechanism that operates on a principle that is substantially like that of the device of the above mentioned patent but in which the frame for the guiding of the elongated gear is improved and the mechanisms for effecting lateral shifting of the guide frame are materially simplified and improved to insure better operation, less friction, and a more positive and longer wearing mechanism. Furthermore, it is an object to improve upon the mechanism of my previously mentioned patent, particularly in the details of locks that will insure an operative connection at all times between the pinion gear and reciprocating internal gears, regardless of the severe strain to which the mechanism may be subjected.

Further objects of the invention reside in the details of construction of parts, in their combination, and mode of operation as will hereinafter be fully described.

In accomplishing the above mentioned and other objects of the invention, I have provided the improved details of construction, the preferred forms of which are illustrated in the accompanying drawings, wherein:

Fig. 4 is an elevation of one of the reciprocating gears and its guide frame, and showing also the gear locks.

Fig. 5 is a cross-section substantially on line 5—5 in Fig. 1.

Fig. 6 is a cross-section on line 6—6 in Fig. 6.

Fig. 7 is a cross-sectional view showing the belt drive connection.

Fig. 9 is an elevation of one of the reciprocating internal gear plates, and indicating in dotted lines its lateral and longitudinal movements.

Referring more in detail to the drawings:

The present device is primarily a mechanical device for the conversion and transmission of power. Specifically, it comprises means whereby rotary motion imparted by an electric motor to a main drive shaft and pinion gear through a belt wheel and gear reduction, is converted to reciprocal motion through the mediacy of what has been referred to in my prior patent as an elongated, internal gear; the gear being mounted for reciprocal travel as effected through its driving connection with the driven pinion gear.

Figure 1:
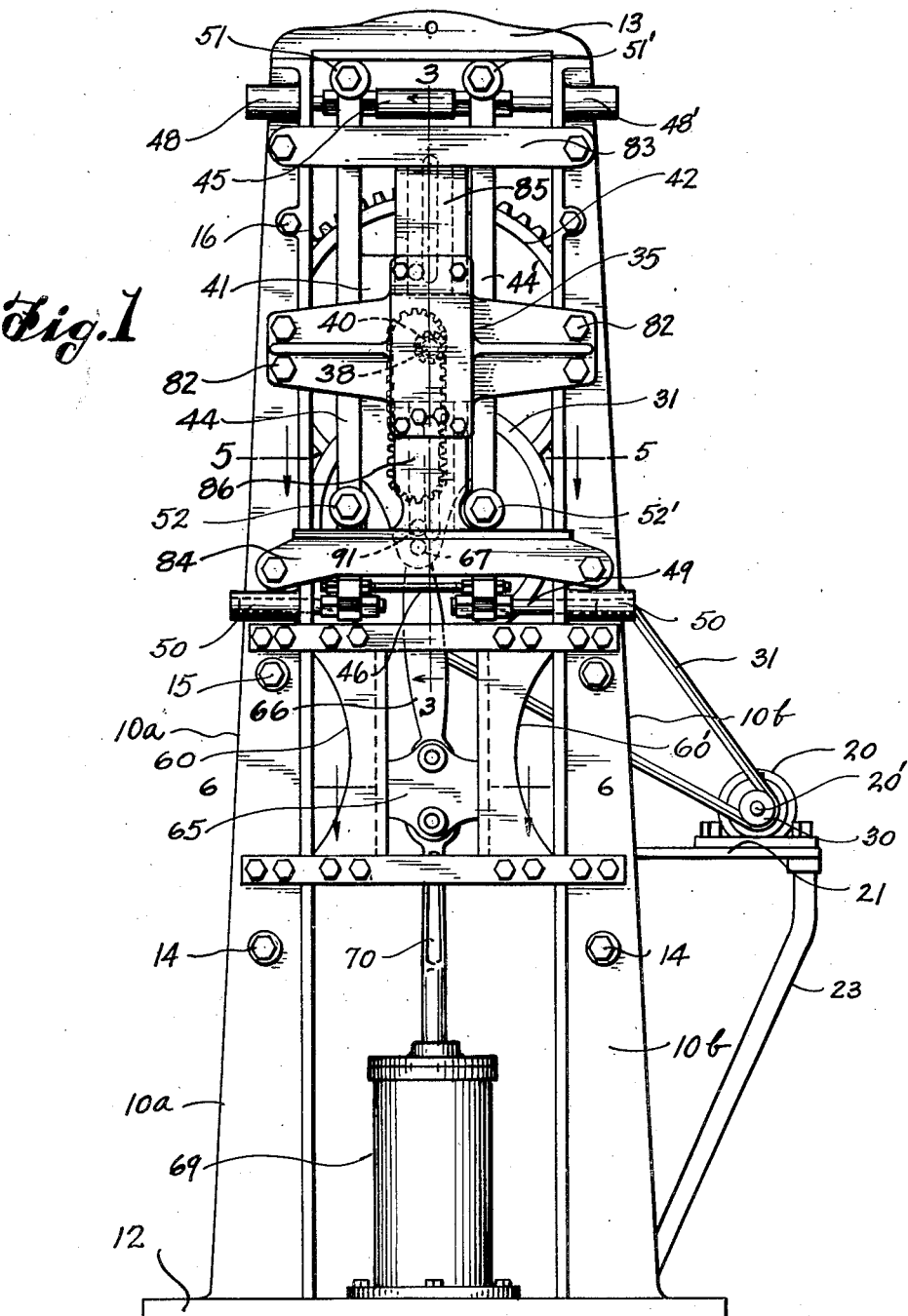
Fig. 1 is an end elevation of a power transmission mechanism embodying the improvements of the present invention therein.
Figure 2:
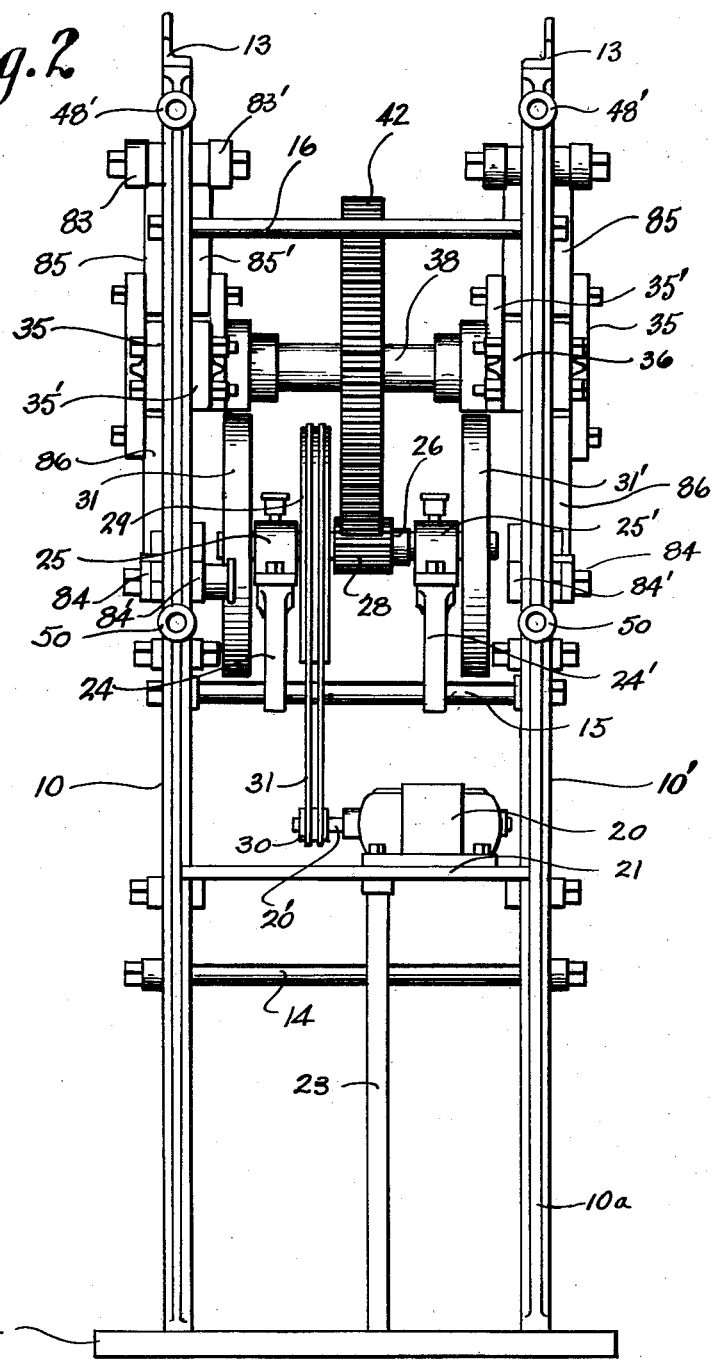
Fig. 2 is a side elevation of the same.

The mechanism of the present invention, in its preferred form of construction, comprises a rigid and substantial main frame structure, made up of opposite end frames which are shown best in Fig. 2, wherein they are designated generally by numerals 10 and 10'. These frames are alike in function and construction; each being made up of two laterally spaced, vertical standards 10a and 10b, which, as shown in Fig. 1, are mounted at their lower ends on a horizontal base plate 12 and are joined across their upper ends by a cross bar 13. Intermediate their upper and lower ends, the standards 10a and 10b, of each end frame, are joined by other cross bars or plates, as presently will be described, and it is shown in Fig. 2 that the opposite end frames 10 and 10' are tied rigidly together at opposite sides of the machine by horizontal rods, or bolts, 14, 15 and 16.

The prime mover, or power unit, may be of any suitable character. In the present device it is shown to be a small electric motor 20, mounted on a horizontal table or plate 21 that is supported from the main frame structure at one side thereof as shown in Fig. 1, wherein it is noted that the plate 21 has supporting connections at its inside edge with the main frame structure and at its outer edge is supported by braces or struts 23.

Figure 3:
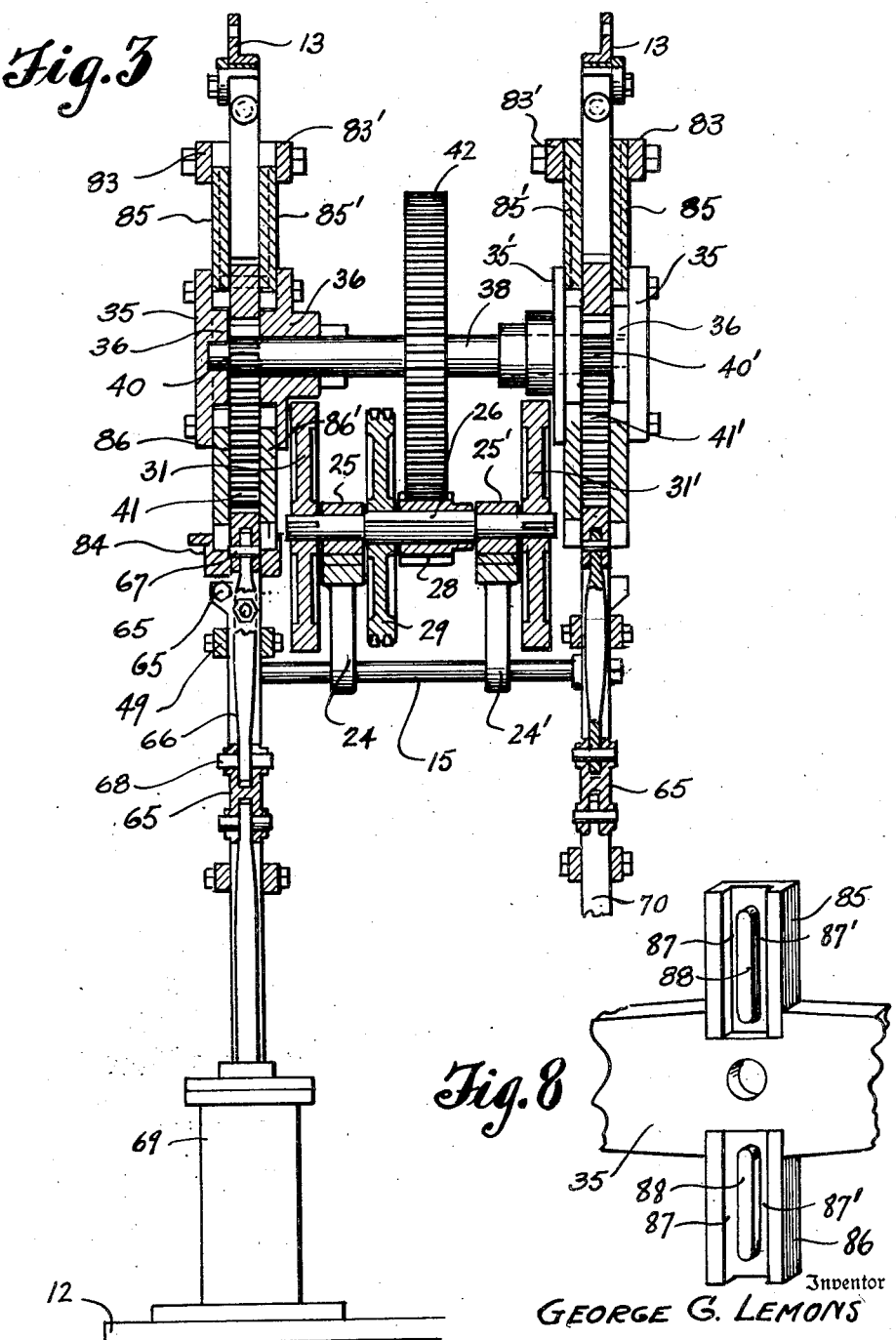
Fig. 3 is a cross-sectional view, substantially on line 3—3 in Fig. 1, showing therein the driving connections between the opposite end pinion gears of the main drive shaft and the two elongated, internal gears, also showing the disposition of the plates that constitute the gear locks.

Supported within the frame structure, on the cross rods 15—15, that are located at opposite sides of the machine and which extend between opposite end frames 10—10', are paired cross members 24—24'. These are spaced apart, and also are equally spaced from the opposite end frames of the machine. Supported by these cross bars, in bearings 25—25' formed thereon, is a horizontal cross shaft 26, located in the central longitudinal vertical plane of the main frame structure. Keyed or otherwise fixed on the shaft 26, midway between the end frames, is a small gear wheel 28, and adjacent thereto a relatively large belt wheel 29. The belt wheel 29 is aligned with a small belt wheel 30 fixed on the drive shaft 20' of the electric motor 20. A pair of V-belts 31 extend about belt wheels 29 and 30 as seen in Fig. 7, thus to effect a reduced speed driving connection between the motor and shaft 26. At its opposite ends, the cross shaft 26 has fly wheels 31—31' keyed thereto to insure a steady operation. These wheels are located within the opposite side frames, as shown in Fig. 3.

Extended between and fixed to the upper end portions of the standards 10a and 10b of each of the opposite end frames 10 and 10', at inner and outer sides thereof, are cross plates 35 and 35'. These plates are formed centrally with bearings, as at 36, in which the opposite end portions of a cross shaft 38 are revolubly contained. The end portions of this shaft, which are between the plates 35 and 35' at opposite sides of the frame, have gear teeth cut therein to provide the small gear pinions 40—40' for driving the previously mentioned internal gears 41—41' as shown in Fig. 3. Keyed on the shaft 38, medially of its ends, is a relatively large gear wheel 42 which meshes with the small gear wheel 28 on cross shaft 26. Thus, through the belts 31 and gears 28 and 42, the motor 20 will operate to rotatably drive the cross shaft 38 and the gear pinions 40—40' at its opposite ends. These latter will turn at a speed considerably reduced below that of the motor shaft but with a greatly increased amount of power as will be understood.

Located within the upper end portions of the opposite end frames 10—10' of the machine, are transversely shiftable frames in which the internal, elongated gears 41—41' are reciprocally contained. Each of these frames comprises spaced, parallel side rails 44—44' that are joined rigidly together across upper and lower ends by tie rods 45 and 46 as best shown in Fig. 4. The opposite end portions of the upper tie rod extend beyond the rails which the rod joins, as noted in Fig. 1, and these portions, which are rounded, are reciprocally contained in guide bearings 48—48' that are formed in the opposite standards 10a and 10b. Likewise, mounted in the lower end portions of the rails 44—44' are laterally extending stub shafts 49—49' and these are slidably contained in bearings 50 formed in the standards 10 and 10'.

The spaced vertical side rails 44—44' of these reciprocally movable frames coact to form vertical guideways in which the elongated gears 41—41', respectively, are contained for vertical, reciprocal movement. Each gear plate is rectangular and is formed at its opposite side edges with longitudinal tongues 53 and the corresponding vertical guide rails have longitudinal channels 54 that are contained in these channels as shown in Fig. 5. Thus, the gears 41—41' are held vertically reciprocable in their frames and the frames in turn are horizontally reciprocable in the side frames of the main frame structure. To give additional support to the guide frames, each is equipped at its upper end with rollers 51—51' adapted to engage in rolling contact with the under edge of the cross rails 13, and at their lower ends are likewise equipped with rollers 52—52' adapted for rolling contact upon the top edges of cross bars later described.

Each gear 41—41' is formed with an elongated, internally toothed opening, as will be understood best by reference to Figs. 4 and 9, and meshing with the teeth of these gears to effect the reciprocal action of the gear plates, are the gear pinions 40 and 40' that are formed on the opposite end portions of the cross shaft 38.

Fixedly supported in each of the opposite side frames of the main frame structure, below the elongated gear plates, are vertically directed, transversely spaced guide bars 60—60, see Fig. 1, between and by which a cross head 65 is mounted for vertical reciprocal movement. These cross heads at opposite sides of the machine are operatively connected with the corresponding reciprocally movable gear plates 41—41', by means of links 66; each link being pivotally connected at its upper end, by means of a pivot bolt 67, with the lower end portion of the gear plate, and at its lower end is pivotally connected to the corresponding cross head by means of a pivot bolt or pin 68.

For operating devices such as the pump 69 shown, power may be transmitted from the cross heads 65. In Fig. 1, I have shown a common form of pump 69 connected to cross heads 65 by connecting rod 70 for its actuation. Other devices might be driven or operated by suitable connections with the cross heads.

Figure 8:
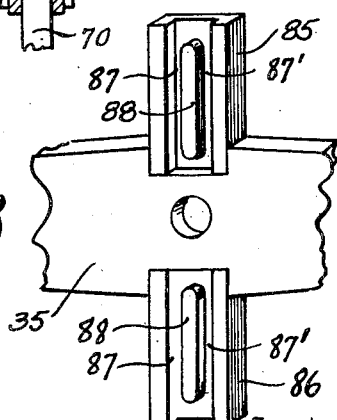
Fig. 8 is an inside view of one of the sets of gear locks or guide plates for a reciprocating gear.

It will be understood by reference to Figs. 1 and 4 in particular, that the gear pinions 40—40' are of substantially lesser diameter than the transverse inside width of the elongated gears 41—41'. The longitudinal toothed surfaces of these elongated gears are parallel and coextensive, and the toothed upper and lower end surfaces thereof are semi-circularly curved. The reciprocal action of the elongated internal gears is effected by reason of the fact that as the gear pinions 40—40' are driven, the internal gears are maintained in mesh therewith. The means for maintaining this intermeshing relationship of gears 40—40' and 41—41' will now be described, reference being directed to Figs. 3, 4 and 8.

Fixed to each of the opposite end frames 10—10' of the main frame structure, at the level of the driven cross shaft 38, are the previously mentioned cross plates 35—35'. These are disposed horizontally with their opposite end portions secured by bolts 82 to the frame standards. Likewise, bolted to the side frames at spaced distances above and below the cross plates 35—35', also at inner and outer sides of the frames, are cross bars 83—83' and 84—84'. Fixed to and extending between the top edge portions of plates 35—35' and cross bars 83—83' are plates 85 and 85', and likewise fixed to the lower edge portions of plates 35—35' and the cross bars 84—84' are plates 86—86'.

The plates 85—85' and 86—86' are located in paired relationship, and are located at outer and inner sides of the planes of operation of the reciprocating gears 41—41'. These plates are herein designated as the gear "lock plates" since they are designed to serve as means to lock the reciprocating gears in definite paths of travel. These paired plates are formed on their inner faces with spaced, vertical guide channels 87—87', as observed in Fig. 8, separated by a land 88 with rounded opposite end portions 88'. Paired upper and lower sets of lock plates are vertically aligned, as noted in Figs. 3 and 4, and reciprocally contain upper and lower end portions of the reciprocating gears between them.

Fixed in and extending to inner and outer faces of each gear plate 41—41', at upper and lower ends thereof, are pins 90 and 91. The ends of these pins are designed to be retained and guided in the vertical channels 87—87' as a means of retaining the reciprocally movable gears in mesh with the driving pinions 40—40'.

It will be understood, more particularly by reference to Fig. 4, that with the driven pinion 40 rotating counter-clockwise, the gear plate 41 will be moving upwardly. The pins 90—91 fixed therein at upper and lower ends will be contained in and moving upward in channels 87 of corresponding lock plates 85 and 86. When the lower end of gear 41 reaches the gear 40, the gear plate and its guide frame will be shifted laterally, to the right, causing the pins 90—91 to move across the rounded end portions of lands 88 and enter the channels 87' for downward travel therein. By means of these pins 90—91 and the channeled plates, the reciprocating gears are positively held in mesh with the driving pinions 40—40' and without any linkage, or driven gear shifting mechanism of that rather complicated type used in my prior patent. All lock plates are rigidly fixed and the reciprocating gears can not follow any except definite and fixed paths. Therefore there is no chance of parts becoming out of mesh or out of timing, and the form of construction and relationship of parts positively insures the desired operating relationship at all times.

Devices or machines of this kind may be put to various uses. The extent to which power may be multiplied is determined by gear ratios and can be increased to many times and still be kept within practical limits. The uses of such machines are varied, and many. The conversion of rotary to reciprocating motion herein provides for the operation of pumps to build up pressure which may involve either air or hydraulic medium. This has been illustrated only as one use of the machine.

Having thus described my invention, what I claim as new therein and desire to secure by Letters Patent is:

1. In a machine of the character described including a main frame, a drive shaft rotatably mounted therein and means for driving said shaft; a guide frame mounted for back and forth travel in the main frame, a gear plate mounted for reciprocal travel in said guide frame at right angle to the direction of movement of the guide frame, and embodying an elongated internal gear therein extending in the direction of the reciprocal travel of the plate, a pinion gear on said drive shaft in operative mesh with the internal gear for its actuation, guide studs fixed in and extending from the gear plate, and lock plates fixed in the main frame and formed with channels for the guided travel of said studs therein to retain the intermeshing relationship of the pinion gear and elongated gear incident to the reciprocal movement of the latter.

2. In a machine of the character described including a main frame, a drive shaft rotatably mounted therein and means for driving said shaft; a guide frame mounted for horizontal reciprocal movement in the main frame, a gear plate mounted for vertical reciprocal movement in the guide frame, and embodying an elongated internal gear therein extending in the direction of its reciprocal travel, a pinion gear on said drive shaft in operative mesh with the internal gear, guide studs fixed in said plate at upper and lower ends, lock plates fixed in the main frame at upper and lower ends of the gear plate and formed with channels for the guided travel of said studs therein to maintain the gears in operative mesh during continuous turning of the pinion gear, and power transmitting means connected with said gear plates.

3. A machine as recited in claim 2 wherein the guide frame is equipped at opposite sides with guide rods and said main frame is formed with bearings slidably containing said guide rods therein, and wherein cross rails are fixed in said main frame across upper and lower ends of the guide frame and rollers are mounted on the frame for rolling contact with said rails to sustain endwise thrust.

4. In a machine of the character described, a main frame structure including opposite side frames, a drive shaft revolubly mounted in the main frame with opposite ends extended to said side frames, means for driving said shaft, a guide frame mounted in each of the said opposite side frames for horizontal back and forth reciprocal movement, a gear plate mounted in each of the guide frames for vertical reciprocal movement therein, and each comprising an elongated internal gear extending parallel with the direction of reciprocation, gear pinions on the ends of the drive shaft meshing, respectively, with the internal gears, studs fixed in and extending from the upper and lower ends of the gear plates, lock plates fixed in the opposite side frames above and below the drive shaft, and formed with channels for the guided travel of said studs therein to maintain the elongated gears in mesh with the pinion gears as the said elongated gears are reciprocally actuated, and power transmitting means connected with the gear plates.

GEORGE G. LEMONS.

No references cited.